US011931636B2

(12) United States Patent
Tabuchi et al.

(10) Patent No.: US 11,931,636 B2
(45) Date of Patent: Mar. 19, 2024

(54) EVALUATION METHOD, EVALUATION SYSTEM AND NON-TRANSITORY COMPUTER-READABLE MEDIUM STORING EVALUATION PROGRAM

(71) Applicant: MIZUNO CORPORATION, Osaka (JP)

(72) Inventors: Noriyuki Tabuchi, Osaka (JP); Kohei Mimura, Osaka (JP)

(73) Assignee: Mizuno Corporation, Osaka (JP)

(*) Notice: Subject to any disclaimer, the term of this patent is extended or adjusted under 35 U.S.C. 154(b) by 573 days.

(21) Appl. No.: 16/939,232

(22) Filed: Jul. 27, 2020

(65) Prior Publication Data

US 2021/0031086 A1  Feb. 4, 2021

(30) Foreign Application Priority Data

Jul. 30, 2019 (JP) ................................ 2019-139928

(51) Int. Cl.
*A63B 69/00* (2006.01)
*G09B 19/00* (2006.01)
*A63B 24/00* (2006.01)

(52) U.S. Cl.
CPC ...... *A63B 69/0002* (2013.01); *G09B 19/0038* (2013.01); *A63B 2024/0009* (2013.01);
(Continued)

(58) Field of Classification Search
CPC . A63B 24/0003; A63B 24/00; A63B 69/0002; A63B 69/00; A63B 2220/00;
(Continued)

(56) References Cited

U.S. PATENT DOCUMENTS 9,646,199 B2 *  5/2017  Bose ................... G11B 31/006
2002/0077189 A1 *  6/2002  Tuer ................... A63B 69/3632
473/151
(Continued)

FOREIGN PATENT DOCUMENTS

JP   2003265665 A   9/2003
JP   2014180576 A   9/2014
(Continued)

OTHER PUBLICATIONS

Japanese Office Action dated Mar. 14, 2023 issued in Japanese Patent Application No. 2019-139928.

*Primary Examiner* — Mohamed Charioui
(74) *Attorney, Agent, or Firm* — Troutman Pepper Hamilton Sanders LLP; James E. Schutz; Korbin Blunck

(57) ABSTRACT

An evaluation method for evaluating a swing characteristic of a subject with respect to a flying and thus coming object, includes: calculating swing information corresponding to a motion characteristic of the object based on sensor data detected by at least one of a first sensor attached to a ball hitting tool or a back of a hand of the subject and a second sensor attached to a waist of the subject when the subject swings the ball hitting tool with respect to the object; classifying a plurality of pieces of such swing information into a plurality of groups based on the motion characteristic of the object; for each of the plurality of groups, extracting representative swing information in the group based on one or more pieces of swing information belonging to the group; and evaluating a swing characteristic of the subject based on the representative swing information of each group.

13 Claims, 14 Drawing Sheets

(52) U.S. Cl.
CPC ... *A63B 2069/0008* (2013.01); *A63B 2220/00* (2013.01); *A63B 2220/30* (2013.01); *A63B 2220/40* (2013.01); *A63B 2220/62* (2013.01); *A63B 2220/803* (2013.01); *A63B 2220/89* (2013.01)

(58) Field of Classification Search
CPC ............ A63B 2220/10; A63B 2220/16; A63B 2220/30; A63B 2220/34; A63B 2220/40; A63B 2220/62; A63B 2220/803; A63B 2220/807; A63B 2220/833; A63B 2220/836; A63B 2220/89; A63B 24/0006; A63B 2102/18; A63B 2102/182; A63B 2024/0009; A63B 2069/0008; A63B 71/0622; A63B 2024/0034; A63B 2071/0666; A63B 2209/00; A63B 2225/50; G09B 19/0038
See application file for complete search history.

(56) References Cited

U.S. PATENT DOCUMENTS

| | | |
|---|---|---|
| 2014/0274486 A1 | 9/2014 | Thurman |
| 2014/0274487 A1 | 9/2014 | Thurman |
| 2014/0277634 A1 | 9/2014 | Thurman |
| 2014/0277635 A1 | 9/2014 | Thurman |
| 2014/0277636 A1 | 9/2014 | Thurman |
| 2015/0224380 A1* | 8/2015 | Iwata ................... A61B 5/6804 702/141 |
| 2016/0101317 A1 | 4/2016 | Kito et al. |
| 2016/0136502 A1* | 5/2016 | Voutilainen ........ G09B 19/0038 73/865.4 |
| 2017/0028282 A1* | 2/2017 | Ito ...................... G06Q 10/0639 |
| 2017/0151484 A1* | 6/2017 | Reilly ................ A63B 69/0024 |
| 2018/0200575 A1* | 7/2018 | Nagaishi ................ A63B 69/38 |
| 2018/0361223 A1* | 12/2018 | Cherryhomes .... A63B 69/0002 |
| 2019/0022487 A1 | 1/2019 | Joo et al. |
| 2019/0099643 A1 | 4/2019 | Tsutsumi et al. |

FOREIGN PATENT DOCUMENTS

| | | |
|---|---|---|
| JP | 2015123304 A | 7/2015 |
| JP | 2015150130 A | 8/2015 |
| JP | 2016073547 A | 5/2016 |
| JP | 2018086288 A | 6/2018 |
| JP | 2019501725 A | 1/2019 |
| JP | 2019081064 A | 5/2019 |
| JP | 2019097853 A | 6/2019 |
| WO | 2018027280 A1 | 2/2018 |
| WO | 2018030424 A1 | 2/2018 |

* cited by examiner

FIG.5

| | PITCHING CONDITION | | | SWING INFORMATION | | | | | | HITTING RESULT |
|---|---|---|---|---|---|---|---|---|---|---|
| NOTIFICATION | TYPE OF PITCH | BALL SPEED (km/h) | | SWING TIME(s) | SWING SPEED (km/h) | ACCELERATION (m/s²) | ROTATIONAL SPEED (rps) | RADIUS OF SWING (m) | VERTICAL BAT ANGLE (deg) | SWING ORBIT (deg) | |
| N | S | 120 | | 0.121 | 117.5 | 153 | 1.60 | 0.11 | -32.5 | -1.4 | OK |
| N | S | 120 | | 0.128 | 119.6 | 185 | 1.57 | 0.07 | -30.3 | -4.4 | OK |
| N | S | 120 | | 0.112 | 108.0 | -239 | -0.05 | 0.12 | -24.1 | -12.8 | OK |
| N | S | 120 | | 0.123 | 116.2 | 18 | 2.81 | 0.08 | -34.3 | -13.9 | NG |
| N | S | 120 | | 0.126 | 122.0 | 193 | 1.31 | 0.11 | -24.6 | 0.3 | OK |
| ... | ... | ... | | ... | ... | ... | ... | ... | ... | ... | ... |
| N | C | 90 | | 0.127 | 98.1 | -309 | 1.30 | 0.11 | -18.6 | 1.6 | OK |
| N | C | 90 | | 0.132 | 105.1 | 139 | 2.31 | 0.08 | -19.2 | 3.0 | NG |
| N | C | 90 | | 0.139 | 89.8 | -329 | 4.10 | 0.13 | -20.3 | 20.1 | NG |
| N | C | 90 | | 0.129 | 106.7 | 39 | 1.13 | 0.08 | -22.7 | -1.5 | NG |
| N | C | 90 | | 0.136 | 102.5 | -297 | 1.28 | 0.06 | -22.5 | 4.9 | OK |
| ... | ... | ... | | ... | ... | ... | ... | ... | ... | ... | ... |
| R | C | 90 | | 0.130 | 114.7 | 64 | 1.54 | 0.12 | -27.3 | -4.9 | NG |
| R | S | 120 | | 0.138 | 119.9 | 66 | 3.24 | 0.08 | -28.1 | 4.7 | NG |
| R | S | 120 | | 0.139 | 117.4 | -449 | 5.00 | 0.06 | -25.7 | 8.4 | OK |
| R | S | 120 | | 0.137 | 121.5 | 71 | 3.45 | 0.07 | -25.1 | 2.5 | NG |
| R | C | 90 | | 0.136 | 126.7 | 98 | 2.24 | 0.07 | -23.4 | 1.5 | NG |
| ... | ... | ... | | ... | ... | ... | ... | ... | ... | ... | ... |

FIG.7

| | TYPE OF PITCH (RESULT) | SWING INFORMATION | | | | | | |
|---|---|---|---|---|---|---|---|---|
| | | SWING TIME(s) | SWING SPEED (km/h) | ACCELERATION (m/s$^2$) | ROTATIONAL SPEED (rps) | RADIUS OF SWING(m) | VERTICAL BAT ANGLE (deg) | SWING ORBIT(deg) |
| Xa1 | S(OK) | 0.124 | 116.9 | 42 | 0.72 | 0.10 | −26.6 | −4.3 |
| Xa2 | S(NG) | 0.125 | 118.4 | 54 | 1.15 | 0.09 | −28.2 | −8.9 |
| Xa3 | C(OK) | 0.126 | 101.0 | −124 | 1.90 | 0.13 | −16.6 | 5.7 |
| Xa4 | C(NG) | 0.131 | 100.6 | −43 | 1.51 | 0.10 | −22.2 | 2.8 |

| COURSE | SWING INFORMATION ||||||||
| | SWING TIME(s) | SWING SPEED(km/h) | ACCELERATION (m/s²) | ROTATIONAL SPEED(rps) | RADIUS OF SWING(m) | VERTICAL BAT ANGLE(deg) | SWING ORBIT(deg) | WAIST'S ANGULAR VELOCITY(deg/s) |
|---|---|---|---|---|---|---|---|---|
| Xb1 — in | 0.131 | 110.0 | 139 | 3.21 | 0.12 | −32.8 | −1.6 | 655.8 |
| Xb2 — in | 0.137 | 108.3 | −123 | 4.17 | 0.12 | −32.0 | −4.1 | 732.3 |
| — in | 0.129 | 120.8 | 100 | 2.89 | 0.14 | −33.3 | −4.5 | 876.6 |
| ... | ... | ... | ... | ... | ... | ... | ... | ... |
| — out | 0.129 | 119.7 | 40 | 2.10 | 0.13 | −30.6 | −2.5 | 758.8 |
| — out | 0.130 | 127.0 | 109 | 1.56 | 0.10 | −29.3 | −8.1 | 762.3 |
| — out | 0.137 | 113.6 | −398 | 2.48 | 0.09 | −35.1 | −3.6 | 682.6 |
| Xbn ... | ... | ... | ... | ... | ... | ... | ... | ... |
| Xin — AVERAGE(in) | 0.134 | 115.6 | 26 | 3.10 | 0.12 | −32.5 | −2.4 | 797.4 |
| Xout — AVERAGE(out) | 0.134 | 120.1 | 2 | 1.91 | 0.11 | −32.5 | −3.7 | 708.3 |

| COURSE | SWING INFORMATION ||||||||
| | SWING TIME(s) | SWING SPEED(km/h) | ACCELERATION (m/s²) | ROTATIONAL SPEED(rps) | RADIUS OF SWING(m) | VERTICAL BAT ANGLE(deg) | SWING ORBIT(deg) | WAIST'S ANGULAR VELOCITY(deg/s) |
|---|---|---|---|---|---|---|---|---|
| in | 0.157 | 104.9 | 22 | 4.93 | 0.07 | −25.1 | 10.0 | 564.5 |
| in | 0.152 | 101.6 | 408 | 4.43 | 0.07 | −27.8 | 8.5 | 583.8 |
| in | 0.154 | 102.7 | −328 | 4.66 | 0.06 | −25.8 | 9.6 | 615.3 |
| ... | ... | ... | ... | ... | ... | ... | ... | ... |
| out | 0.146 | 102.6 | 43 | 2.79 | 0.06 | −31.4 | 14.7 | 505.5 |
| out | 0.151 | 106.7 | −79 | 3.01 | 0.03 | −30.1 | 12.7 | 545.4 |
| out | 0.153 | 103.5 | −141 | 4.73 | 0.04 | −28.0 | 12.9 | 568.1 |
| ... | ... | ... | ... | ... | ... | ... | ... | ... |
| AVERAGE(in) | 0.152 | 103.0 | −16 | 4.71 | 0.07 | −26.3 | 9.1 | 581.4 |
| AVERAGE(out) | 0.151 | 105.4 | −147 | 3.27 | 0.04 | −29.5 | 14.0 | 552.3 |

FIG.9

| | CONDITION | SWING INFORMATION | | | | | | |
|---|---|---|---|---|---|---|---|---|
| | | SWING TIME(s) | SWING SPEED (km/h) | ACCELERATION (m/s$^2$) | ROTATIONAL SPEED(rps) | RADIUS OF SWING(m) | VERTICAL BAT ANGLE (deg) | SWING ORBIT(deg) |
| Xc1 | SS | 0.142 | 101.0 | −17 | 2.39 | 0.06 | −26.6 | −1.2 |
| Xc2 | CS | 0.150 | 93.5 | −57 | 3.05 | 0.09 | −27.0 | −3.3 |
| Xc3 | SC | 0.141 | 89.9 | −85 | 1.05 | 0.10 | −23.8 | 3.4 |
| Xc4 | CC | 0.137 | 92.2 | 60 | 1.65 | 0.11 | −24.0 | 4.2 |

SS: FASTBALL (IMMEDIATELY PREVIOUS TYPE OF PITCH: FASTBALL)
CS: FASTBALL (IMMEDIATELY PREVIOUS TYPE OF PITCH: CURVEBALL)
SC: CURVEBALL (IMMEDIATELY PREVIOUS TYPE OF PITCH: FASTBALL)
CC: CURVEBALL (IMMEDIATELY PREVIOUS TYPE OF PITCH: CURVEBALL)

FIG.10

| | CONDITION | SWING INFORMATION | | | | | | |
|---|---|---|---|---|---|---|---|---|
| | | SWING TIME(s) | SWING SPEED (km/h) | ACCELERATION (m/s$^2$) | ROTATIONAL SPEED(rps) | RADIUS OF SWING(m) | VERTICAL BAT ANGLE (deg) | SWING ORBIT(deg) |
| Xd1 | N_C | 0.117 | 112.7 | 112.7 | 0.96 | 0.13 | −29.0 | −5.8 |
| Xd2 | R_C | 0.117 | 112.6 | 112.6 | 1.54 | 0.12 | −23.7 | −4.0 |
| Xd3 | N_S | 0.125 | 117.9 | 117.9 | 0.95 | 0.09 | −29.4 | −4.5 |
| Xd4 | R_S | 0.133 | 118.8 | 118.8 | 1.42 | 0.07 | −30.5 | 0.9 |

N_C: CURVEBALL(NOTIFIED)
R_C: CURVEBALL(NOT NOTIFIED)
N_S: FASTBALL(NOTIFIED)
R_S: FASTBALL(NOT NOTIFIED)

FIG.11

| LABEL | TYPE OF PITCH | COURSE | LEVEL |
|---|---|---|---|
| 1 | FASTBALL | INSIDE | CENTER |
| 2 | CURVEBALL | CENTER | HIGH |
| 3 | FASTBALL | OUTSIDE | LOW |
| 4 | FASTBALL | INSIDE | HIGH |
| 5 | CURVEBALL | OUTSIDE | LOW |

FIG.12

<table>
<tr><th rowspan="2">TYPE OF PITCH</th><th colspan="6">BALL PARAMETERS 470</th></tr>
<tr><th>BALL SPEED (km/h)</th><th>NO. OF ROTATIONS(rpm)</th><th>AZIMUTH ANGLE(deg)</th><th>ELEVATION ANGLE(deg)</th><th>AMOUNT OF HORIZONTAL BREAK</th><th>AMOUNT OF VERTICAL BREAK</th></tr>
<tr><td>S</td><td>126</td><td>1818</td><td>25</td><td>-34</td><td>194</td><td>179</td></tr>
<tr><td>S</td><td>140.4</td><td>2226</td><td>29</td><td>-30</td><td>384</td><td>403</td></tr>
<tr><td>C</td><td>96</td><td>2364</td><td>142</td><td>28</td><td>-370</td><td>-470</td></tr>
<tr><td>C</td><td>111</td><td>1950</td><td>138</td><td>32</td><td>-200</td><td>-330</td></tr>
</table>

EVALUATION METHOD, EVALUATION SYSTEM AND NON-TRANSITORY COMPUTER-READABLE MEDIUM STORING EVALUATION PROGRAM

This nonprovisional application is based on Japanese Patent Application No. 2019-139928 filed on Jul. 30, 2019 with the Japan Patent Office, the entire contents of which are hereby incorporated by reference.

BACKGROUND OF THE INVENTION

Field of the Invention

The present disclosure relates to a technique for evaluating a swing characteristic of a subject.

Description of the Background Art

In sports, such as a baseball game and a softball game, performed by using a ball hitting tool such as a bat, the ability of a player to swing the ball hitting tool is an important index in advantageously proceeding with a game or the like. Therefore, it is expected that how the player swings a ball hitting tool is appropriately evaluated to also make contribution to improvement of the player's skill and research and development of ball hitting tools.

Japanese Patent Laid-Open No. 2015-123304 discloses a swing evaluation method for evaluating a swing of a hitting tool. The swing evaluation method includes measuring a speed of a hitting tool with respect to a target direction for swing, measuring a history speed continuously recording a speed of the hitting tool while it is swung, and evaluating a swing based on the speed with respect to the target direction and the history speed.

During a game, a player needs to properly hit a ball of various types (e.g., a type of pitch, a course, etc.) flying and thus coming to the player. Therefore, in order to appropriately evaluate a player's swing characteristics, it is required to appropriately evaluate how the player swings with respect to what type of ball. Japanese Patent Laid-Open No. 2015-123304 discusses evaluating a relationship between a target direction for swing and a speed of a hitting tool, although neither teaching nor suggesting any technique for the above needs.

SUMMARY OF THE INVENTION

An object of an aspect of the present disclosure is to provide an evaluation method, an evaluation system, and an evaluation program that can accurately evaluate a swing characteristic of a subject with respect to a flying and thus coming object with higher precision.

According to an embodiment, an evaluation method for evaluating a swing characteristic of a subject with respect to a flying and thus coming object is provided. The evaluation method comprises: calculating swing information corresponding to a motion characteristic of the object based on sensor data detected by at least one of a first sensor attached to a ball hitting tool or a back of a hand of the subject and a second sensor attached to a waist of the subject when the subject swings the ball hitting tool with respect to the object; classifying a plurality of pieces of such swing information into a plurality of groups based at least on the motion characteristic of the object; for each of the plurality of groups, extracting representative swing information in the group based on one or more pieces of swing information belonging to the group; and evaluating a swing characteristic of the subject based on the representative swing information of each group.

Preferably, the calculating includes calculating as the swing information at least one of a time of a swing, a speed of the swing, an acceleration of the swing at impact, a rotational speed at impact, a radius of rotation of the swing, a vertical bat angle of the ball hitting tool, and an orbit of the swing, based on the sensor data detected by the first sensor.

Preferably, the calculating includes calculating as the swing information a maximum angular velocity about a body axis of the subject, based on the sensor data detected by the second sensor.

Preferably, the motion characteristic of the object includes at least one of a speed of the object, a type of pitch of the object, and a course of the object.

Preferably, the classifying includes classifying a plurality of pieces of such swing information into the plurality of groups based on the motion characteristic of the object and a first condition of whether the subject is previously notified of the motion characteristic of the object.

Preferably, the classifying includes classifying a plurality of pieces of such swing information into the plurality of groups based on a motion characteristic of the object for a k-th time, k being an integer equal to or greater than 2, and a second condition of whether motion characteristics of the object for a (k−n)-th time to a (k−1)-th time, n being an integer equal to or greater than 1 and less than k, are identical to the motion characteristic of the object for the k-th time, and the motion characteristics of the object for the (k−n)-th time to the (k−1)-th time are identical.

Preferably, the motion characteristic of the object is determined by an observer who observes the object.

Preferably, the motion characteristic of the object is determined based on sensor data detected by a third sensor incorporated in the object, a captured image obtained by capturing an image of the object, or data obtained by tracking the object by a radar.

Preferably, the representative swing information in the group is an average value, a median value, or a variance of one or more pieces of swing information belonging to the group.

Preferably, the calculating includes calculating the swing information when the subject swings the ball hitting tool with respect to a virtual object in a virtual reality environment.

Preferably, the evaluating includes evaluating a swing characteristic of the subject based on a result of comparing the representative swing information of a first group of the plurality of groups and the representative swing information of a second group of the plurality of groups, and the method further comprises outputting advice derived from a result of evaluating the swing characteristic of the subject.

According to another embodiment, an evaluation system for evaluating a swing characteristic of a subject with respect to a flying and thus coming object is provided. The evaluation system comprises: a swing information calculation unit that calculates swing information corresponding to a motion characteristic of the object based on sensor data detected by at least one of a first sensor attached to a ball hitting tool or a back of a hand of the subject and a second sensor attached to a waist of the subject when the subject swings the ball hitting tool with respect to the object; a classification unit that classifies a plurality of pieces of such swing information into a plurality of groups based at least on the motion characteristic of the object; an extraction unit that extracts, for each of the plurality of groups, representative swing information in the group based on one or more pieces of swing information belonging to the group; and an evaluation unit that evaluates a swing characteristic of the subject based on the representative swing information of each group.

According to still another embodiment, an evaluation program for causing a computer to evaluate a swing characteristic of a subject with respect to a flying and thus coming object is provided. The evaluation program causes the computer to perform: calculating swing information corresponding to a motion characteristic of the object based on sensor data detected by at least one of a first sensor attached to a ball hitting tool or a back of a hand of the subject and a second sensor attached to a waist of the subject when the subject swings the ball hitting tool with respect to the object; classifying a plurality of pieces of such swing information into a plurality of groups based at least on the motion characteristic of the object; for each of the plurality of groups, extracting representative swing information in the group based on one or more pieces of swing information belonging to the group; and evaluating a swing characteristic of the subject based on the representative swing information of each group.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing a table of swing information according to a first example.

FIG. 7 is a diagram showing a table of representative swing information according to the first example.

FIG. 8A is a diagram for illustrating a swing characteristic of a subject according to a second example.

FIG. 8B is a diagram for illustrating a swing characteristic of a subject according to the second example.

FIG. 9 is a diagram for illustrating a swing characteristic of a subject according to a third example.

FIG. 10 is a diagram for illustrating a swing characteristic of a subject according to a fourth example.

FIG. 11 is a diagram showing an example of a method for labeling motion characteristics of a ball.

FIG. 12 is a diagram showing a relationship between a type of pitch and a ball parameter.

DESCRIPTION OF THE PREFERRED EMBODIMENTS

Hereinafter, an embodiment will be described with reference to the drawings. In the following description, identical components are identically denoted. Their names and functions are also identical. Accordingly, they will not be described repeatedly in detail.

<System Configuration>

Figure 1:
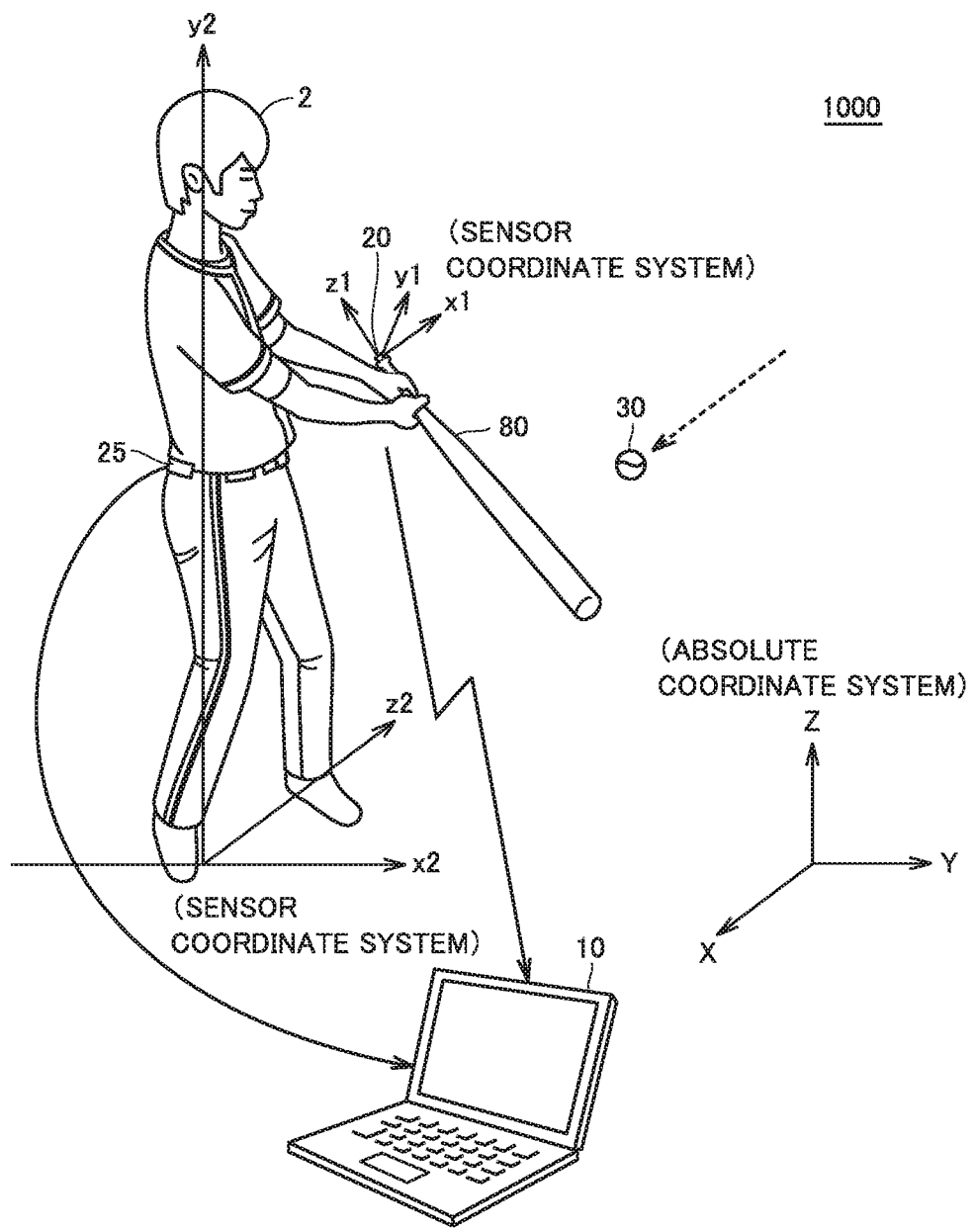
FIG. 1 is a diagram for illustrating an overall configuration of an evaluation system according to an embodiment.

FIG. 1 is a diagram for illustrating an overall configuration of an evaluation system 1000 according to an embodiment. Referring to FIG. 1, evaluation system 1000 is a system for evaluating a swing characteristic of a subject 2 with respect to a flying and thus coming object (e.g., a ball). Specifically, evaluation system 1000 includes an evaluation device 10 and sensor devices 20 and 25.

In the present embodiment, it is assumed that a bat 80 used in a baseball game, a softball game, or the like is used as a "ball hitting tool," and that subject 2 is a right-handed batter. Further, it is assumed that when ball 30 flies and thus comes to subject 2, subject 2 swings bat 80 with respect to ball 30. Bat 80 may be either one prepared by subject 2 per se or one prepared by another person.

Evaluation device 10 is composed of a laptop PC (personal computer). However, evaluation device 10 can be implemented as any device of any type. For example, evaluation device 10 may be a device such as a smartphone, a tablet terminal, a desktop PC or the like.

Evaluation device 10 communicates with sensor devices 20 and 25 in a wireless communication system. For example, the wireless communication system is BLE (Bluetooth® Low Energy), Bluetooth®, a wireless LAN (Local Area Network), or the like. Evaluation device 10 may be configured to be capable of communicating with sensor devices 20 and 25 using wired communication such as USB (Universal Serial Bus).

Sensor device 20 includes an angular velocity sensor capable of detecting angular velocities about mutually orthogonal three axes (x1, y1, and z1 axes in FIG. 1), and an acceleration sensor capable of detecting acceleration along mutually orthogonal three axes (x1, y1, and z1 axes in FIG. 1).

Sensor device 20 is attached to a grip end of bat 80 so that the acceleration and angular velocity sensors of sensor device 20 are less affected by the bat's vibration. Sensor device 20 is firmly fixed to the grip end so as not to move even while bat 80 is swung. Preferably, the acceleration sensor included in sensor device 20 is disposed on the major axis of bat 80 in order to eliminate an effect of centrifugal acceleration caused by rotation of bat 80 about the major axis. Herein, in the sensor's coordinate system, the z1 axis is the bat's major axis, and the x1 axis and the y1 axis can be set as desired.

Sensor device 25 includes an angular velocity sensor capable of measuring angular velocities about mutually orthogonal three axes (x2, y2, and z2 axes in FIG. 1). Sensor device 25 may include an acceleration sensor capable of measuring acceleration along mutually orthogonal three axes (x2, y2, and z2 axes in FIG. 1).

Sensor device 25 is attached to the waist of subject 2 via a waist attachment member (not shown) such that the angular velocity sensor (and the acceleration sensor) has or each have its three axes thereof oriented in the direction of the body axis of the batter (in FIG. 1, the y2 axis: an axis extending from the batter's waist toward the batter's head). For example, in the sensor's coordinate system, the z2 axis is set to be an axis extending in a direction in which the batter swings, and the x2 axis is set to be an axis extending in a direction perpendicular to the y2 and z2 axes. Note that the direction in which the batter swings is a direction in which the ball is hit and outgoes (the direction of the ball hit).

In the absolute coordinate system, the Z axis is a vertical direction, and the X axis and the Y axis are set as desired.

<Outlining Operation of System>

Figure 2:
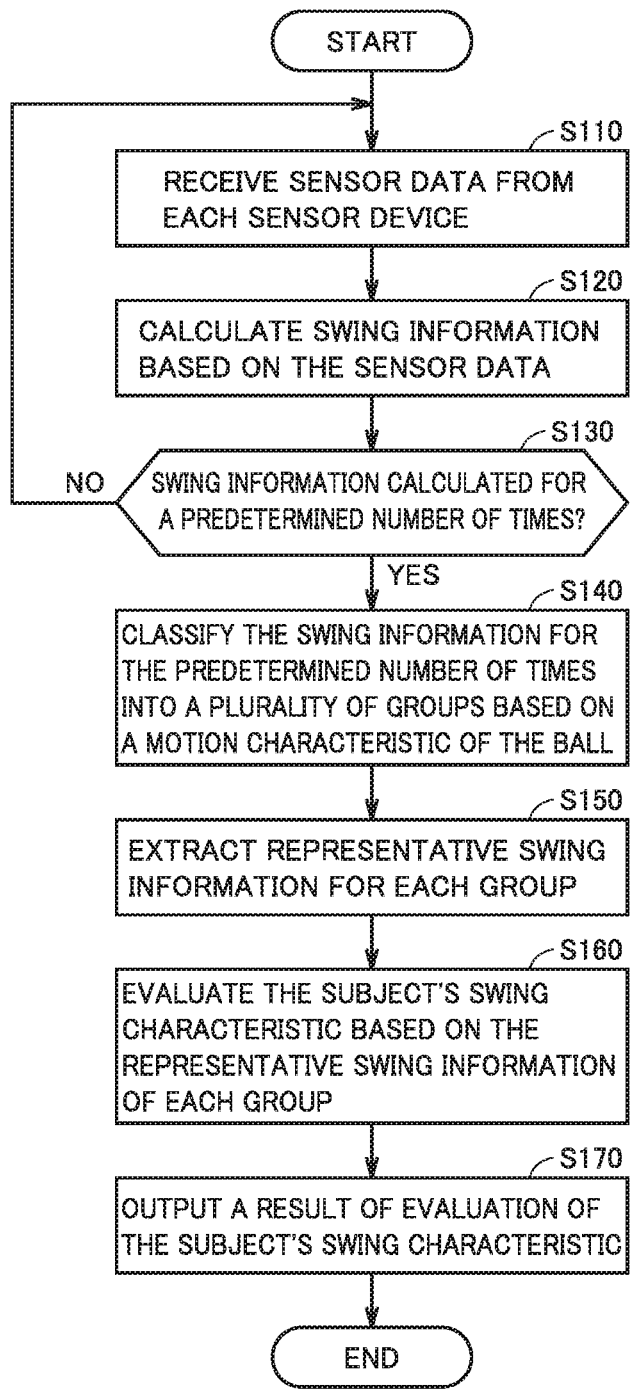
FIG. 2 is a flowchart for outlining an operation of the evaluation system according to the present embodiment.

FIG. 2 is a flowchart for outlining an operation of evaluation system 1000 according to the present embodiment.

Referring to FIG. 2, in evaluation system 1000, when ball 30 flies and thus comes to subject 2, and subject 2 swings bat 80 with respect to ball 30, evaluation device 10 receives sensor data from sensor devices 20, 25 (step S110). Specifically, evaluation device 10 receives from sensor device 20 acceleration information (acceleration in three axial directions) and angular velocity information (angular velocity in three axial directions) at bat 80, and receives from sensor device 25 angular velocity information (angular velocity in three axial directions) at the waist of subject 2. Typically, ball 30 is released toward subject 2 by a pitching machine according to a preset pitching condition.

Sensor device 20 detects angular velocity information and acceleration information in the sensor's coordinate system (that is, a local coordinate system) every sampling period (for example of 1 ms), and sends the detected angular velocity information and acceleration information to evaluation device 10. Sensor device 25 detects angular velocity information in the sensor's coordinate system every sampling period (for example of 1 ms), and sends the detected angular velocity information to evaluation device 10.

Evaluation device 10 calculates swing information based on the sensor data received from sensor devices 20 and 25 (step S120). Specifically, evaluation device 10 calculates a swing time, a swing speed, an acceleration at impact, a rotational speed, a radius of swing, a vertical bat angle, and a swing orbit as the swing information based on time-series acceleration information and angular velocity information sent from sensor device 20. Evaluation device 10 calculates a maximum angular velocity of the waist of subject 2 about the body axis as the swing information based on time-series angular velocity information sent from sensor device 25.

Evaluation device 10 performs steps S110 and S120 to calculate swing information obtained when subject 2 swings bat 80 with respect to ball 30. More specifically, the calculated swing information will be swing information corresponding to a motion characteristic of ball 30 when it flies and thus comes to the subject. For example, when ball 30 of a type of pitch of fastball flies and thus comes to the subject, swing information corresponding to the type of pitch of "fastball" is calculated.

Evaluation device 10 determines whether such swing information has been calculated for a predetermined number of times (step S130). When such swing information has not been calculated for the predetermined number of times (NO in step S130), steps S110 and S120 are repeated.

When such swing information has been calculated for the predetermined number of times (YES in step S130), evaluation device 10 classifies the swing information for the predetermined number of times into a plurality of groups based on a motion characteristic of ball 30 (step S140). For example, evaluation device 10 classifies some of the swing information for the predetermined number of times that corresponds to a type of pitch of "fastball" into a group GU1 and classifies some of the swing information for the predetermined number of times that corresponds to a type of pitch of "curveball" into a group GU2.

For each of the plurality of groups, evaluation device 10 extracts representative swing information for the group based on one or more pieces of swing information belonging to the group (step S150). For example, evaluation device 10 calculates an average value of one or more pieces of swing information belonging to a group as representative swing information of the group.

Evaluation device 10 evaluates the subject's swing characteristic based on the representative swing information of each group (step S160). For example, evaluation device 10 evaluates the subject's swing characteristic based on a result of comparing the representative swing information of group GM and the representative swing information of group GU2. For example, it is assumed that the swing speed in the representative swing information of group GU2 (the average swing speed for the type of pitch of "curveball") is larger than the swing speed in the representative swing information of group GU1 (the average swing speed for the type of pitch of "fastball"). In this case, evaluation device 10 can evaluate that subject 2 has such a swing characteristic that the subject swings faster for "curveball" than "fastball."

Evaluation device 10 outputs a result of evaluation of a swing characteristic of subject 2 (step S170). Specifically, evaluation device 10 displays the evaluation result on a display. Evaluation device 10 may output advice derived from the estimation result.

<Hardware Configuration>

(Evaluation Device)

Figure 3:
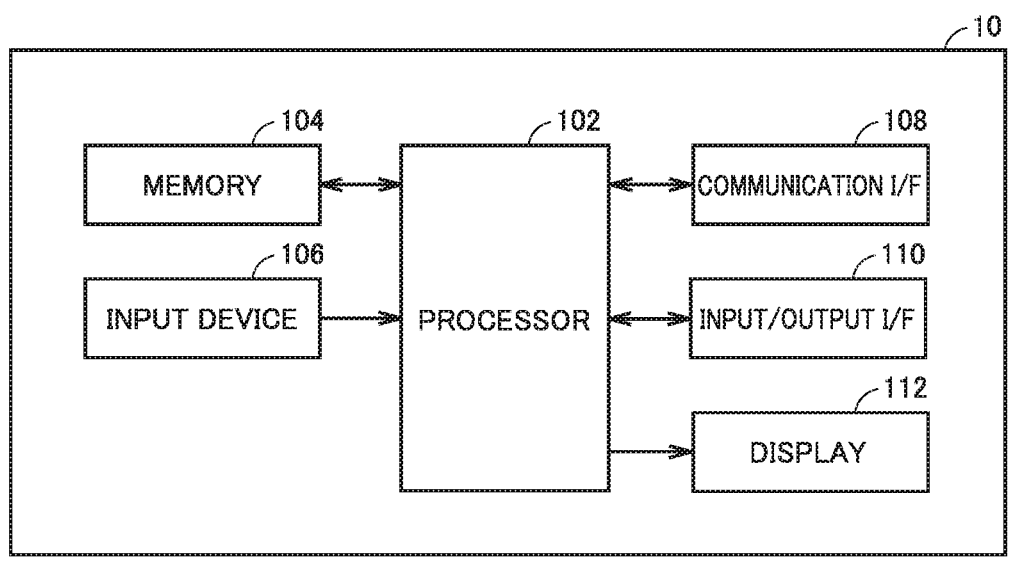
FIG. 3 is a block diagram showing a hardware configuration of an evaluation device according to the present embodiment.

FIG. 3 is a block diagram showing a hardware configuration of evaluation device 10 according to the present embodiment. Referring to FIG. 3, evaluation device 10 includes, as major components, a processor 102, a memory 104, an input device 106, a communication interface (I/F) 108, an input/output interface (I/F) 110, and a display 112. These units are connected to each other via a bus.

Processor 102 controls the operation of each unit of evaluation device 10 by reading and executing various programs stored in memory 104. Processor 102 is typically a computing unit such as a central processing unit (CPU) or a multi-processing unit (MPU).

Memory 104 is implemented by a random access memory (RAM), a read-only memory (ROM), a flash memory, or the like. Memory 104 stores programs executed by processor 102 or data used by processor 102.

Input device 106 receives an input through an operation done to evaluation device 10. Input device 106 is implemented for example as a keyboard, buttons, and a mouse. Input device 106 may be implemented as a touch panel.

Communication interface (I/F) 108 sends and receives various data to and from sensor devices 20 and 25. As a communication system, for example, a wireless communication system using BLE, Bluetooth®, wireless LAN, or the like is used. A wired communication system such as USB may be used as the communication system.

Input/output interface 110 communicates signals with external devices. Typically, input/output interface 110 communicates with external devices in a wired communication system such as USB.

Display 112 displays images, text, and other information on a display screen based on signals received from processor 102.

(Sensor Device)

Figure 4:
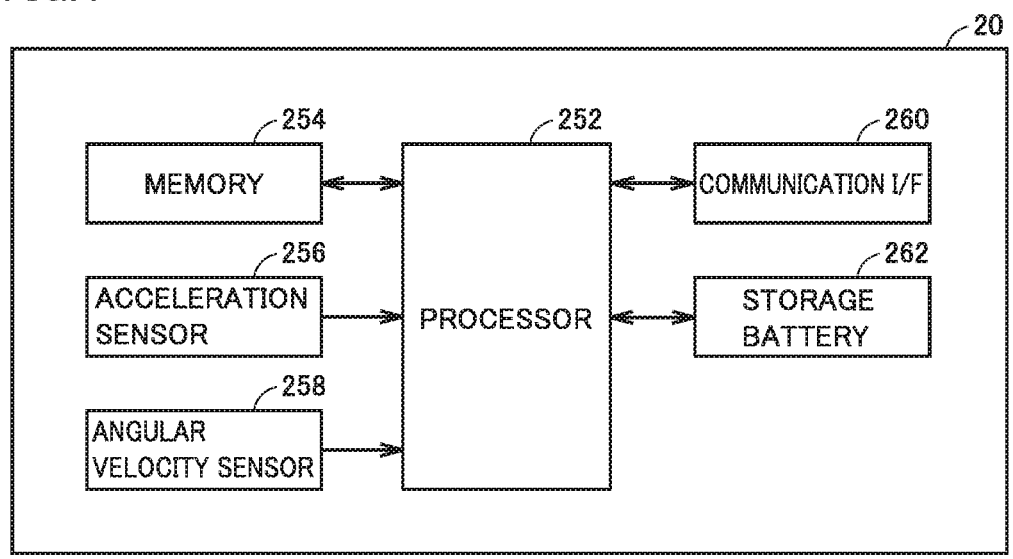
FIG. 4 is a block diagram showing a hardware configuration of a sensor device according to the present embodiment.

FIG. 4 is a block diagram showing a hardware configuration of sensor device 20 according to the present embodiment. Referring to FIG. 4, sensor device 20 includes, as major components, a processor 252 for performing various processes, a memory 254 for storing programs executed by processor 252, data and the like, an acceleration sensor 256 capable of detecting acceleration in three axial directions, an angular velocity sensor 258 capable of detecting angular velocities about three axes, a communication interface (I/F) 260 for communicating with evaluation device 10, and a storage battery 262 for supplying electric power to various components of sensor device 20. Sensor device 25 has a hardware configuration similar to that of sensor device 20.

<Evaluation Method>

A method for evaluating a swing characteristic will now be described in various examples.

First Example

FIG. 5 is a diagram showing a table 410 of swing information according to the first example. In table 410, a ball-throwing condition includes three conditions, that is, a type of pitch, a ball speed, and a notification condition. A type of pitch of "S" indicates that a type of pitch is fastball, and a type of pitch of "C" indicates that a type of pitch is curveball. For ball speed, 120 km/h or 90 km/h is indicated.

A notification condition of "normal" (corresponding to "N" in table 410) indicates that subject 2 is previously notified of what motion characteristic ball 30 has when it flies and thus comes to the subject. A notification condition of "random" (corresponding to "R" in table 410) indicates that subject 2 is not notified previously of what motion characteristic ball 30 has when it flies and thus comes to the subject.

For example, a pitching condition corresponding to a row X1 is that subject 2 is previously notified that ball 30 with the type of pitch of "fastball" and a ball speed of "120 km/h" will fly and come to the subject. On the other hand, a pitching condition corresponding to a row X2 is that subject 2 is previously not notified that ball 30 with the type of pitch of "curveball" and a ball speed "90 km/h" will fly and come to subject 2.

Table 410 shows swing information corresponding to each pitching condition. For example, the swing information when the pitching condition corresponding to row X1 is applied includes a swing time of 0.121 (s), a swing speed of 117.5 (km/h), an acceleration at impact of 153 (m/s$^2$), a rotational speed of 1.60 (rps), a radius of swing of 0.11 (m), a vertical bat angle of −32.5 (deg), and a swing orbit of −1.4 (deg).

A swing time is a time from a start of a swing to an impact. A swing speed is a maximum speed of a head's speed during a swing. An acceleration at impact is an instantaneous swing acceleration at impact. A rotational speed is a rotational speed of bat 80 at impact in a forward direction (about the z1 axis). A radius of swing is a radius of rotation of a swing and indicates by how much the center of rotation of bat 80 is located in a direction toward the head of bat 80 from the grip end thereof. A vertical bat angle indicates a downward degree (or angle) of bat 80 at impact. For example, when the bat head is raised, the vertical bat angle will have a positive value, whereas when the head is lowered, the vertical bat angle will have a negative value. A swing orbit indicates a direction in which bat 80 moves at impact (more specifically, an upward direction or a downward direction). For example, when bat 80 moves in an upward direction, bat 80 will provide a swing orbit having a positive value, whereas when bat 80 moves in a downward direction, bat 80 will provide a swing orbit having a negative value.

The swing information shown in table 410 is calculated by using a known swing analysis application program to analyze time-series acceleration information and angular velocity information detected by sensor device 20 attached to bat 80.

In addition, a hitting result of "OK" indicates that the subject has been able to appropriately hit ball 30 flying and thus coming to the subject with bat 80, and a hitting result of "NG" indicates that the subject has failed to appropriately hit ball 30. Typically, a hitting result is determined by a person (e.g., an observer who observes subject 2 swing). Alternatively, a hitting result may be objectively determined based on a measurement result obtained through a known measurement device by measuring a flight distance or the like of ball 30 when it is hit.

Subject 2 swings bat 80 to hit ball 30 according to each pitching condition. For example, when subject 2 swings with respect to ball 30 according to a certain pitching condition, evaluation device 10 obtains sensor data (that is, time-series acceleration information and angular velocity information) from sensor device 20, and calculates swing information based on the sensor data. A hitting result at that time is determined by a person and input to evaluation device 10. Evaluation device 10 associates the pitching condition, the calculated swing information, and the hitting result with one another and thus stores them in memory 104. By repeating this process, table 410 is obtained.

Figure 6A:
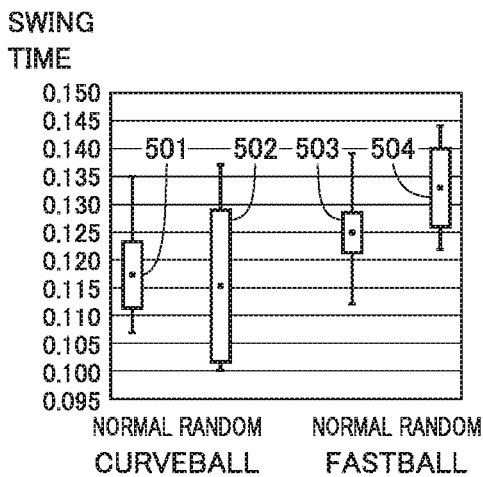
FIG. 6A is a diagram for illustrating a swing characteristic of a subject according to the first example.
Figure 6B:
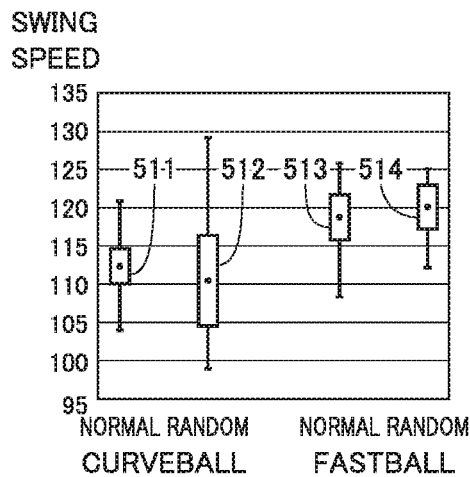
FIG. 6B is a diagram for illustrating a swing characteristic of the subject according to the first example.
Figure 6C:
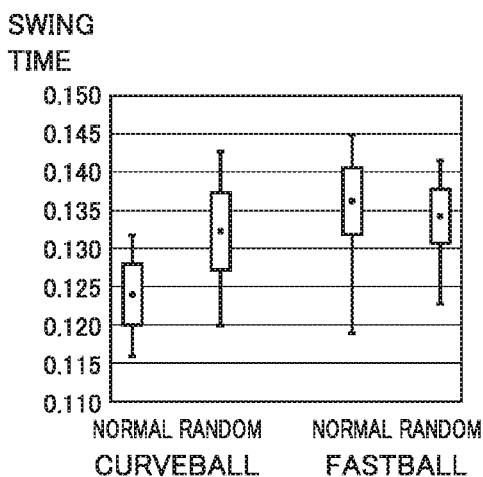
FIG. 6C is a diagram for illustrating a swing characteristic of a subject according to the first example.
Figure 6D:
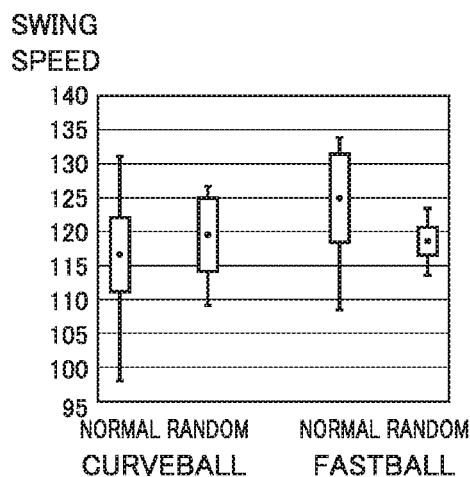
FIG. 6D is a diagram for illustrating a swing characteristic of the subject according to the first example.
Figure 6E:
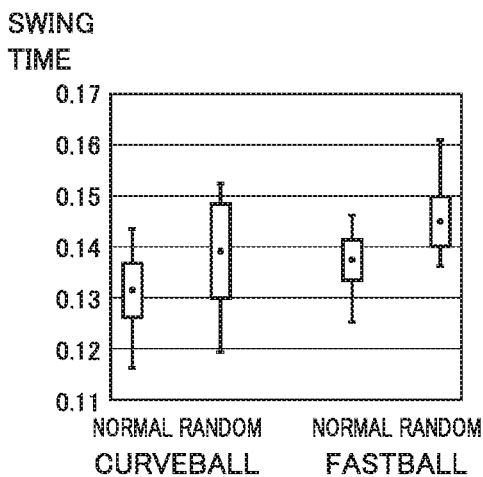
FIG. 6E is a diagram for illustrating a swing characteristic of a subject according to the first example.
Figure 6F:
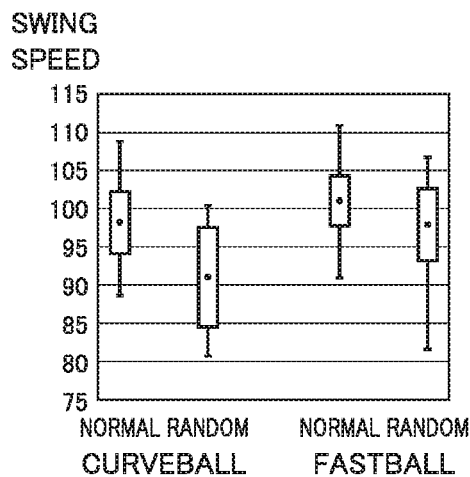
FIG. 6F is a diagram for illustrating a swing characteristic of the subject according to the first example.

FIGS. 6A to 6F are diagrams for illustrating a subject's swing characteristic according to a first example. Specifically, FIGS. 6A and 6B represent subject 2's swing time and swing speed, respectively. FIGS. 6C and 6D represent another subject U's swing time and swing speed, respectively. FIGS. 6E and 6F represent a subject T's swing time and swing speed, respectively.

Evaluation device 10 refers to table 410, and classifies a plurality of pieces of swing information into a plurality of groups based on a motion characteristics of ball 30. In the example of FIGS. 6A to 6F, evaluation device 10 classifies a plurality of pieces of swing information into a plurality of groups based on a type of pitch of ball 30 (i.e., fastball or curveball) and a notification condition. More specifically, evaluation device 10 classifies the plurality of pieces of swing information indicated in table 410 into a group A1 including swing information corresponding to a notification condition of "normal" and the type of pitch of "curveball," a group A2 including swing information corresponding to a notification condition of "random" and the type of pitch of "curveball," a group A3 including swing information corresponding to the notification condition of "normal" and the type of pitch of "fastball," and a group A4 including swing information corresponding to the notification condition of "random" and the type of pitch of "fastball."

FIG. 6A shows a graph 501 of swing time included in each swing information belonging to group A1, a graph 502 of swing time included in each swing information belonging to group A2, a graph 503 of swing time included in each swing information belonging to group A3, and a graph 504 of swing time included in each swing information belonging to group A4. FIG. 6B similarly indicates graphs 511 to 514 of swing speeds belonging to groups A1 to A4.

For each of groups A1 to A4, evaluation device 10 calculates an average value of the pieces of swing information belonging to the group as representative swing information of the group. For example, a representative swing time of group A1 is an average value of the swing times belonging to group A1, and a representative swing speed of group A1 is an average value of the swing speeds belonging to group A1. Note that representative swing information of each group may be a median value of the pieces of swing information belonging to the group, or may be a variance of the pieces of swing information belonging to the group.

Evaluation device 10 compares the representative swing times (or representative swing speeds) of groups A1 to A4 to evaluate subject 2's swing characteristic. In the case of FIG. 6A, the average value of the swing times corresponding to graph 503 is larger than the average value of the swing times corresponding to graph 501, and the average value of the swing times corresponding to graph 504 is larger than the average value of the swing times corresponding to graph 502. Accordingly, for example, evaluation device 10 evaluates that subject 2 has such a swing characteristic that the subject provides a larger swing time for the type of pitch of "fastball" than the type of pitch of "curveball." In the case of FIG. 6B, for example, evaluation device 10 evaluates that subject 2 has such a swing characteristic that the subject provides a larger swing speed for the type of pitch of "fastball" than the type of pitch of "curveball."

In the case of FIG. 6C, for example, evaluation device 10 evaluates that subject U has such a swing characteristic that the subject provides a larger swing time for the type of pitch of "fastball" than the subject does for the type of pitch of "curveball" only under the notification condition of "normal." In the case of FIG. 6D, for example, evaluation device 10 evaluates that subject U has such a swing characteristic that the subject provides a larger swing speed for the type of pitch of "fastball" than the subject does for the type of pitch of "curveball" only under the notification condition of "normal."

In the case of FIG. 6E, for example, evaluation device 10 evaluates that subject T has such a swing characteristic that the subject provides a larger swing time under the notification condition of "random" than the subject does under the notification condition of "normal" for any type of pitch. In addition, evaluation device 10 evaluates that subject T also has such a swing characteristic that the subject provides a larger swing time for the type of pitch of "fastball" than the subject does for the type of pitch of "curveball."

In the case of FIG. 6F, for example, evaluation device 10 evaluates that subject T has such a swing characteristic that the subject provides a smaller swing speed under the notification condition of "random" than the subject does under the notification condition of "normal" for any type of pitch. Further, evaluation device 10 evaluates that subject T also has such a swing characteristic that the subject provides a larger swing speed for the type of pitch of "fastball" than the subject does for the type of pitch of "curveball."

Thus, evaluation device 10 can evaluate subject 2's swing characteristic by comparing each representative swing information of groups A1 to A4. Further, evaluation device 10 can also generate advisory information for how subject 2 should swing based on an evaluation result of the subject's swing characteristic and the subject's hitting result.

FIG. 7 is a diagram showing a table 420 of representative swing information according to the first example. Referring to FIG. 7, evaluation device 10 generates table 420 based on each swing information of table 410 and stores table 420 in memory 104. Specifically, evaluation device 10 classifies the plurality of pieces of swing information shown in table 410 into a plurality of groups based on a motion characteristic of ball 30 and a result of hitting the ball.

For example, evaluation device 10 classifies the plurality of pieces of swing information shown in table 410 into a group B1 including swing information corresponding to the type of pitch of "fastball" and a hitting result of "OK," a group B2 including swing information corresponding to the type of pitch of "fastball" and a hitting result of "NG," a group B3 including swing information corresponding to the type of pitch of "curveball" and a hitting result of "OK," and a group B4 including swing information corresponding to the type of pitch of "curveball" and a hitting result of "NG." For each of groups B1 to B4, evaluation device 10 calculates an average value of the pieces of swing information belonging to the group as representative swing information of the group. The pieces of swing information of rows Xa1 to Xa4 correspond to the pieces of representative swing information of groups B1 to B4, respectively.

In table 420, when the column of "swing orbit" is noted, a larger swing orbit is provided in the case of the hitting result of "OK" than the hitting result of "NG" for any type of pitch. A swing orbit having a larger value indicates a swing having a swing orbit in an upward direction. Therefore, subject 2 can properly hit ball 30 when the subject provides an upward swing.

Further, in table 420, when the column of "vertical bat angle" is noted for the type of pitch of "curveball," a smaller vertical bat angle is provided in the case of the hitting result of "NG" than the hitting result of "OK." A vertical bat angle having a smaller value indicates that bat 80 has its head lowered. Therefore, subject 2 cannot properly hit ball 30 when a curveball is thrown and the subject holds bat 80 with its head lowered.

Evaluation device 10 generates advisory information for improving how subject 2 should swing based on a result of comparing the subject 2's swing characteristic in the case of the hitting result of "OK" and that in the case of the hitting result of "NG." For example, evaluation device 10 generates advisory information "Make an effort to swing in an upward direction. When hitting a curveball, be conscious to hold the bat without lowering the head." and causes display 112 to display the advisory information.

Second Example

FIGS. 8A and 8B are diagrams for illustrating a subject's swing characteristic according to a second example. Specifically, FIG. 8A shows a table 430 showing subject 2's swing information. FIG. 8B shows a table 435 showing subject U's swing information.

In the second example, subjects 2 and U hit ball 30 on a tee placed in an inside course or an outside course. In this case, subjects 2 and U swing a bat with respect to ball 30 located in the inside or outside course in a state in which ball 30's position relative to the subjects is restricted. Therefore, while ball 30 is stationary, the subjects can simulate swinging as if ball 30 actually flies and thus comes inside or outside. Note that subjects 2 and U may swing with respect to ball 30 released from a pitching machine in which a pitching course (an inside course or an outside course) is previously set, or may swing with respect to ball 30 tossed by a person inside or outside.

In the FIG. 8A table 430, a course of "inside" as a motion characteristic of ball 30 indicates an inside pitching course. A course of "outside" as a motion characteristic of ball 30 indicates an outside pitching course.

Table 430 indicates swing information including each parameter (that is, a swing time, a swing speed, an acceleration at impact, a rotational speed, a radius of swing, a vertical bat angle, and a swing orbit) calculated based on sensor data received from sensor device 20 and a parameter (that is, a waist's angular velocity) calculated based on sensor data received from sensor device 25. A waist's angular velocity is a maximum angular velocity about the body axis of subject 2 (that is, about the y2 axis in FIG. 1).

In table 430, along a row Xin is indicated an average value of pieces of swing information corresponding to an inside course, and along a row Xout is indicated an average value of pieces of swing information corresponding to an outside course.

Evaluation device 10 classifies a plurality of pieces of swing information corresponding to rows Xb1 to Xbn into a plurality of groups based on a course of ball 30. Specifically, evaluation device 10 classifies the plurality of pieces of swing information into a group C1 including swing information corresponding to the course of "inside" and a group C2 including swing information corresponding to the course of "outside." For each of groups C1 and C2, evaluation device 10 calculates an average value of the pieces of swing information belonging to the group as representative swing information of the group. The swing information of row Xin indicates the representative swing information of group C1, and that of row Xout indicates the representative swing information of group C2.

Evaluation device 10 evaluates the subject 2's swing characteristic by comparing the representative swing information of group C1 and that of C2. In the case of FIG. 8A, for example, evaluation device 10 evaluates that subject 2 has such a swing characteristic that the subject provides a larger waist angular velocity for the outside course than the inside course. Therefore, subject 2 tends to rotate his/her body faster in swinging for ball 30 flying and thus coming inside.

In the case of FIG. 8B, for example, evaluation device 10 evaluates that a larger swing orbit is provided for the outside course than the inside course. Accordingly, subject U tends to provide an upward swing when ball 30 flies and thus comes outside.

While in the above description evaluation device 10 evaluates subject 2's swing characteristic by noting a waist angular velocity and a swing orbit out of parameters of swing information, this is not exclusive. Evaluation device 10 may evaluate subject 2's swing characteristic based on other parameters.

Third Example

FIG. 9 is a diagram for illustrating a subject's swing characteristic according to a third example. Specifically, FIG. 9 shows a table 440 indicating representative swing information provided when subject 2 swings according to the third example.

In the third example, subject 2 hits ball 30 without being previously notified of what motion characteristic ball 30 has when it flies and thus comes to the subject (that is, under the notification condition of "random"). This is repeated m times, m being an integer equal to or greater than 2, and evaluation device 10 obtains swing information for the m times. Evaluation device 10 classifies the swing information for (m−1) times into a plurality of groups based on a motion characteristic (e.g., a type of pitch) of ball 30 for a k-th time, k being an integer equal to or greater than 2, and equal to or smaller than m), and a history condition indicating whether a motion characteristic of ball 30 for a (k−1)-th time is the same as the motion characteristic of ball 30 for the k-th time.

More specifically, let us assume that for the (k−1)-th time out of m times, ball 30 flies and thus comes with the type of pitch "fastball," and for the k-th time, ball 30 flies and thus comes with the type of pitch of "fastball." In this case, evaluation device 10 classifies the swing information for the k-th time into a group D1 as swing information corresponding to a condition of "SS." When for the (k−1)-th time, ball 30 flies and thus comes with the type of pitch "curveball," and for the k-th time, ball 30 flies and thus comes with the type of pitch of "fastball," evaluation device 10 classifies the swing information for the k-th time into a group D2 as swing information corresponding to a condition of "CS."

When for the (k−1)-th time, ball 30 flies and thus comes with the type of pitch "fastball," and for the k-th time, ball 30 flies and thus comes with the type of pitch of "curveball," evaluation device 10 classifies the swing information for the k-th time into a group D3 as swing information corresponding to a condition of "SC." When for the (k−1)-th time, ball 30 flies and thus comes with the type of pitch "curveball," and for the k-th time, ball 30 flies and thus comes with the type of pitch of "curveball," evaluation device 10 classifies the swing information for the k-th time into a group D4 as swing information corresponding to a condition of "CC."

For each of groups D1 to D4, evaluation device 10 calculates an average value of the pieces of swing information belonging to the group as representative swing information of the group. The pieces of swing information of rows Xc1 to Xc4 correspond to the pieces of representative swing information of groups D1 to D4, respectively.

In table 440, when any swing speed when the current type of pitch is "fastball" is noted, a swing speed when the immediately previous type of pitch is different from the current type of pitch (that is, under a condition of "CS") is smaller than a swing speed when the immediately previous type of pitch is identical to the current type of pitch (that is, under a condition of "SS"). When any swing speed when the current type of pitch is "curveball" is noted, a swing speed when the immediately previous type of pitch is different from the current type of pitch (that is, under a condition of "SC") is smaller than a swing speed when the immediately previous type of pitch is identical to the current type of pitch (that is, under a condition of "CC"). Therefore, for example, evaluation device 10 evaluates that subject 2 has such a swing characteristic that the subject swings at a reduced speed when there is a change between the immediately previous type of pitch and the current type of pitch.

It is also believed that subject 2 has a problem in his/her ability to respond to a change in type of pitch. Accordingly, based on a result of an evaluation of the swing characteristic of interest, evaluation device 10 causes display 112 to display advice "You need to practice hitting in circumstances where type of pitch randomly changes."

While in the above description, evaluation device 10 evaluates subject 2's swing characteristic by noting swing speed, evaluation device 10 may evaluate subject 2's swing characteristic based on another parameter.

Furthermore, in the above, evaluation device 10 may classify a plurality of pieces of swing information into a plurality of groups based on a history condition indicating whether the motion characteristics of ball 30 for (k−n)-th to (k−1)-th times are identical to the motion characteristic of ball 30 for the k-th time, and the motion characteristic of ball 30 for the k-th time, where n is an integer of 1 or more and less than k ($1 \leq n < k$). It is assumed that the motion characteristics of ball 30 for the (k−n)-th to (k−1)-th times are identical. For example, a case where n is "2" and k is "3" will be described.

Specifically, let us assume that the type of pitch of ball 30 flying and thus coming for the (k−n)-th time (that is, a first time) and the type of pitch of ball 30 flying and thus coming for the (k−1)-th time (that is, a second time) are "fastball," and the type of pitch of ball 30 flying and thus coming for the k-th time (that is, a third time) is "fastball." In this case, evaluation device 10 classifies the swing information for the third time into a group Da1 as swing information corresponding to a condition of "SSS." When the types of pitch of ball 30 flying and thus coming for the first and second times are "curveball" and the type of pitch of ball 30 flying thus coming for the third time is "fastball," then, evaluation device 10 classifies the swing information for the third time into a group Da2 as swing information corresponding to a condition of "CCS."

When the types of pitch of ball 30 flying and thus coming for the first and second times are "fastball" and the type of pitch of ball 30 flying thus coming for the third time is "curveball," then, evaluation device 10 classifies the swing information for the third time into a group Da3 as swing information corresponding to a condition of "SSC." When the types of pitch of ball 30 flying and thus coming for the first and second times are "curveball" and the type of pitch of ball 30 flying thus coming for the third time is "curveball," then, evaluation device 10 classifies the swing information for the third time into a group Da4 as swing information corresponding to a condition of "CCC."

Fourth Example

FIG. 10 is a diagram for illustrating a subject's swing characteristic according to a fourth example. Specifically, FIG. 10 shows a table 450 generated based on each swing information of table 410. Specifically, evaluation device 10 classifies the plurality of pieces of swing information shown in table 410 into a plurality of groups based on a motion characteristic of ball 30 and a notification condition.

More specifically, evaluation device 10 classifies the plurality of pieces of swing information shown in table 410 into a group E1 including swing information corresponding to the type of pitch of "curveball" and the notification condition of "normal," a group E2 including swing information corresponding to the type of pitch of "curveball" and the notification condition of "random," a group E3 including swing information corresponding to the type of pitch of "fastball" and the notification condition of "normal," and a group E4 including swing information corresponding to the type of pitch of "fastball" and the notification condition of "random."

Table 450 indicates a condition of "N_C," which corresponds to swing information classified into group E1, a condition of "R_C," which corresponds to swing information classified into group E2, a condition of "N_S," which corresponds to swing information classified into group E3, and a condition of "R_S," which corresponds to swing information classified into group E4. For each of groups E1 to E4, evaluation device 10 calculates an average value of the pieces of swing information belonging to the group as representative swing information of the group. The pieces of swing information of rows Xd1 to Xd4 correspond to the pieces of representative swing information of groups E1 to E4, respectively.

In table 450 when radius of swing is noted, a radius of swing for the type of pitch of "curveball" (i.e., under conditions of "N_C" and "R_C") is larger than a radius of swing for the type of pitch of "fastball" (i.e., under conditions of "N_S" and "R_S"). Accordingly, evaluation device 10 for example evaluates that subject 2 has such a swing characteristic that the subject provides a larger radius of swing for the type of pitch of "curveball" than the subject does for the type of pitch of "fastball."

A larger radius of swing indicates a compact swing. Accordingly, based on the result of the evaluation of the swing characteristic of interest, evaluation device 10 for example causes display 112 to display advice "Try to provide more compact swing when hitting fastball."

<Motion Characteristics of Ball>

When ball 30 has a motion characteristic (e.g., a type of pitch, a ball speed, and a pitching course) previously set in a pitching machine, evaluation device 10 can also consider a motion characteristic of ball 30 released from the pitching machine to match a previously set motion characteristic. However, there may be a case in which a motion characteristic previously set in the pitching machine may not necessarily match a motion characteristic of ball 30 actually flying thus coming. Furthermore, in the first place, no motion characteristic can be set for ball 30 when a subject swings for ball 30 thrown by a person.

Accordingly, ball 30's motion characteristic may be determined by a skilled person (e.g., an umpire) who observes ball 30 when it actually flies and comes. FIG. 11 is a diagram showing an example of a method for labeling a motion characteristic of ball 30.

Referring to FIG. 11, as a result of a skilled person observing ball 30 when it actually flies and thus comes, and determining that ball 30 is of a type of pitch of "fastball" and has a course of "inside" and a level of "center," ball 30 has a motion characteristic labeled with a label of "1." The same applies to labels "2" to "5."

Note that an image of ball 30 when it actually flies and thus comes may be captured by a high-accuracy camera, and a motion characteristic of ball 30 may be determined based on the captured image. In this case, the captured image includes a still image and a motion video. A skilled person may confirm the captured image and perform the labeling shown in FIG. 11, or evaluation device 10 may analyze the captured image by using a known image analysis program to perform the labeling.

As another example, a known radar trajectory measuring instrument may be used to track ball 30 with a radar to obtain data when ball 30 actually flies and thus comes, and determine a motion characteristic of ball 30 based on the data. The radar trajectory measuring instrument is an instrument capable of measuring a ball's speed, rotational speed, magnitude of how it changes, axis of rotation, trajectory, and the like. Thus, based on the data obtained by the radar trajectory measuring instrument, the ball speed, type of pitch, and course of ball 30 when it actually flies and thus comes can be specified.

As another example, information obtained from a ball having a sensor device incorporated therein may be used to specify a motion characteristic of the ball. FIG. 12 is a diagram showing a relationship between types of pitch of a ball and ball parameters. It is assumed herein that evaluation device 10 and the sensor device incorporated in the ball can communicate with each other and evaluation device 10 receives sensor data from the sensor device.

Referring to FIG. 12, a table 470 shows ball parameters, which are calculated by analyzing the sensor data obtained from the sensor device incorporated in the ball. Specifically, evaluation device 10 receives via communication interface 108 the sensor data received from the sensor device (e.g., time-series acceleration information, angular velocity information, and geomagnetic information). Evaluation device 10 analyzes the time-series acceleration information, angular velocity information, and geomagnetism information by using a known ball analysis application program to calculate the ball parameters indicated in table 470. The ball parameters include a ball speed, a rotational speed, an azimuth angle, an elevation angle, an amount of a horizontal break, and an amount of a vertical break. A rotational speed indicates how many times the ball rotates per unit time immediately after the ball is released. An azimuth angle is a yaw angle when an axis which is identical to a direction in which the ball travels is a roll axis. An elevation angle is a pitch angle when the axis that is identical to the direction in which the ball travels is the roll axis. An amount of a horizontal break and an amount of a vertical break are a horizontal component and a vertical component, respectively, of a difference between a location arrived at by the ball when the ball travels at a speed thereof as measured immediately after it is released, and thus free-falls, and a location arrived at by the ball when it receives lift caused by rotation.

According to table 470, there is a large difference between the type of pitch of "fastball" and the type of pitch of "curveball" in azimuth angle, elevation angle, amount of horizontal break, and amount of vertical break. Accordingly, a type of pitch can be determined based on these ball parameters.

For example, each ball parameter for each type of pitch is prepared previously and stored in memory 104. Evaluation device 10 analyzes sensor data received from a sensor device incorporated in a ball by using a known ball analysis application program to calculate a ball parameter.

Evaluation device 10 can compare a ball parameter stored in memory 104 for each type of pitch with a ball parameter of the ball when it actually flies and comes, to determine the type of pitch of the ball that actually flies and comes. For example, evaluation device 10 determines a ball parameter of those of types of pitches that most matches that of the ball that actually flied and came. Evaluation device 10 determines that the type of pitch corresponding to the determined ball parameter is the type of pitch of the ball that actually flied and came. According to the configuration of FIG. 12, a type of pitch and a ball speed can be obtained as motion characteristics of a ball.

Modified Example

In the above-described embodiment, subject 2's swing characteristic is evaluated using an actual ball 30. In a modified example, a configuration in which subject 2's swing characteristic is evaluated using a ball in a virtual reality will be described.

Figure 13:
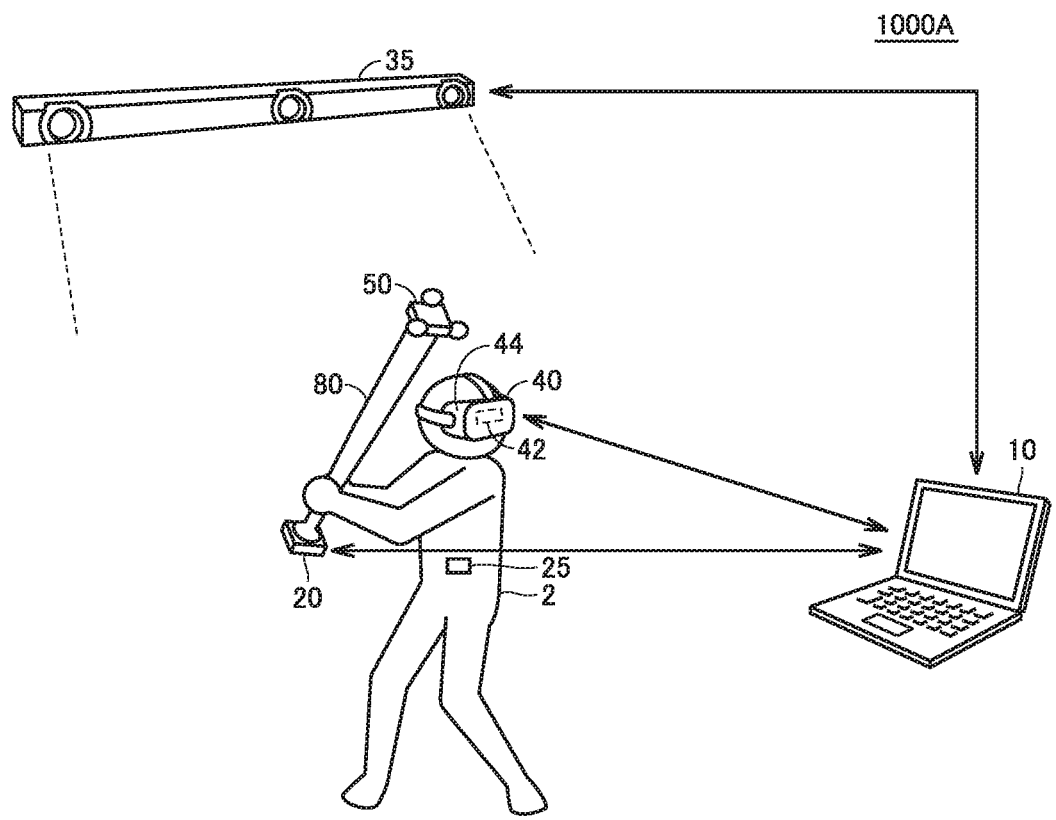
FIG. 13 is a diagram for illustrating an overall configuration of an evaluation system according to a modified example of the present embodiment.

FIG. 13 is a diagram for illustrating an overall configuration of an evaluation system 1000A according to a modified example of the present embodiment. Referring to FIG. 13, evaluation system 1000A includes evaluation device 10, sensor devices 20 and 25, an imaging system 35, a head mounted display (hereinafter also referred to as "HMD") 40, and a marker 50. In the modified example, it is assumed that subject 2 swings bat 80 in a booth provided in an establishment or the like.

Evaluation device 10 communicates with imaging system 35 and HMD 40 using a wired communication system. For example, evaluation device 10 communicates signals with imaging system 35 and HMD 40 via input/output interface 110.

Imaging system 35 is an optical motion capture system, and captures an image of marker 50 attached to the head of bat 80 to obtain the head's positional information and postural information. Specifically, imaging system 35 includes a plurality of (e.g., three) infrared cameras disposed above within the booth. Each infrared camera has a lens, and an infrared LED (light emitting diode) around the lens.

By using as marker 50 a spherical marker having a surface with a retroreflective material applied thereto, a retroreflective reflection of infrared light is caused toward the infrared camera. Thus, where marker 50 is located in the image captured by the infrared camera can be determined. By using a plurality of infrared cameras known in where they are located in a space, a three-dimensional location of marker 50 in a space can be calculated from the location of marker 50 in an image of each camera. Further, by arranging three or more markers 50 on the head of bat 80 and determining where markers 50 are located, the head's position and posture can be obtained.

The positional information and postural information of the head of bat 80 obtained by imaging system 35 are sent to evaluation device 10. As imaging system 35, for example, hardware and software provided by OptiTrack can be used.

HMD 40 can be mounted on the head of subject 2 to provide subject 2 with a three-dimensional image of a virtual space having a depth in operation. Specifically, HMD 40 includes a monitor 42 and an HMD sensor 44.

Monitor 42 is implemented for example as a non-transmissive display device. Monitor 42 is disposed in the main body of HMD 40 so as to be positioned in front of both eyes of subject 2, and displays an image for the right eye and an image for the left eye. When the eyes of subject 2 visually recognize their respective images, subject 2 can recognize the images as a three-dimensional image based on the parallax of both eyes. Thus, subject 2 wearing HMD 40 on the head can experience a feeling close to the real world as a three-dimensional image in the virtual space.

HMD sensor 44 detects the position and posture of the head of subject 2. HMD sensor 44 detects the position and posture of the head of subject 2 in an absolute coordinate system for the head of subject 2 by an angular velocity sensor, an acceleration sensor, or the like, and outputs a detected signal to evaluation device 10. HMD sensor 44 is integrated with HMD 40, and when HMD 40 is attached to the head of subject 2, HMD sensor 44 can track the motion of the head of subject 2 to detect its position and posture. By feeding back a detected result to the three-dimensional image of the virtual space presented by HMD 40, a three-dimensional image from a perspective corresponding to the motion of the head of subject 2 can be presented to subject 2. As HMD 40 having such a configuration, for example, HTC Vive®, Oculus Rift®, or the like can be used.

In a virtual reality environment presented on monitor 42 are arranged a virtual bat that is a virtual object of bat 80 held by subject 2, a virtual pitcher serving as a competitor against subject 2, a virtual ball released by the virtual pitcher, and the like, for example. Evaluation device 10 sets a type of pitch, a ball speed, a course, and the like for the virtual ball released by the virtual pitcher as information immediately before pitching. Subject 2 wears HMD 40 and swings bat 80 with respect to the virtual ball as it flies and thus comes in the virtual reality environment. When the subject swings the bat, evaluation device 10 calculates swing information corresponding to a motion characteristic of the ball based on sensor data detected by sensor devices 20 and 25. The motion characteristic of the ball includes a type of pitch, a ball speed, a course, and the like of the virtual ball released by the virtual pitcher that have previously been set as the information immediately before pitching.

Thus, according to the modified example, as well as when ball 30 is actually used, swing information corresponding to a motion characteristic of a ball can be obtained. Therefore, evaluation device 10 can evaluate subject 2's swing characteristic by applying the above-described evaluation system based on a plurality of pieces of swing information obtained.

While in the above modified example a subject wearing an HMD swings with respect to a virtual ball in a virtual reality environment, this is not exclusive. For example, a subject may swing bat 80 with respect to a virtual ball in a virtual reality environment utilizing an immersive virtual reality system.

<Functional Configuration>

Figure 14:
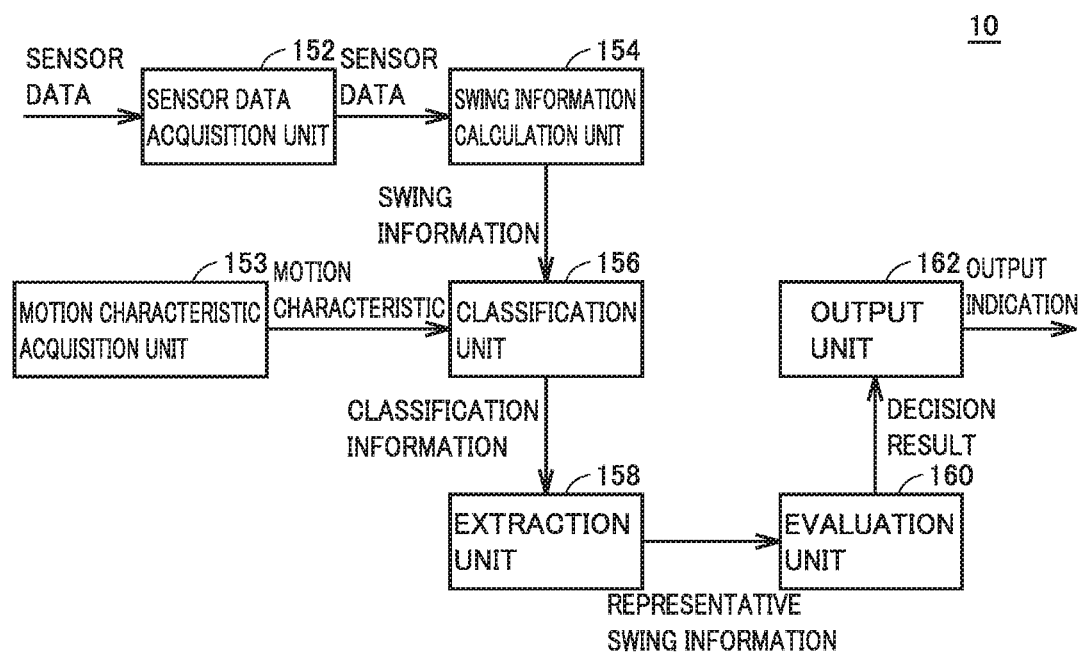
FIG. 14 is a functional block diagram of the evaluation device according to the present embodiment.

FIG. 14 is a functional block diagram of evaluation device 10 according to the present embodiment. Referring to FIG. 14, evaluation device 10 includes a sensor data acquisition unit 152, a swing information calculation unit 154, a classification unit 156, an extraction unit 158, an evaluation unit 160, and an output unit 162 as a major functional configuration. These are basically implemented by the evaluation device 10 processor 102 executing a program stored in memory 104, providing instructions to components of evaluation device 10, and the like. These functional configurations may partially or entirely be implemented by hardware.

Sensor data acquisition unit 152 acquires sensor data detected by each of sensor devices 20 and 25. Specifically, sensor data acquisition unit 152 receives acceleration information and angular velocity information from sensor device 20 attached to bat 80, and receives angular velocity information from sensor device 25 attached to the waist of subject 2. When a sensor device is attached inside of ball 30, sensor data acquisition unit 152 receives acceleration information, angular velocity information, and geomagnetic information from that sensor device.

Motion characteristic acquisition unit 153 acquires a motion characteristic of ball 30. When ball 30 is thrown by a pitching machine, motion characteristic acquisition unit 153 receives an input of a ball speed, a type of pitch, and a course set in the pitching machine, and acquires these as a motion characteristic of ball 30.

As another example, when a motion characteristic of ball 30 is determined by an observer who observes ball 30 when it actually flies and comes, motion characteristic acquisition unit 153 acquires the motion characteristic of ball 30 (in this case, a type of pitch and a course) by receiving an input of a type of pitch and a course determined by a skilled person. As ball 30's speed, a ball speed set in the pitching machine may be adopted or a value measured with a speed gun may be used.

As still another example, motion characteristic acquisition unit 153 may acquire a motion characteristic of ball 30 based on a captured image obtained by capturing an image of ball 30 when it actually flies and comes. Specifically, motion characteristic acquisition unit 153 acquires the type of pitch and course of ball 30 by analyzing the captured image of ball 30. For example, motion characteristic acquisition unit 153 acquires the type of pitch and course of ball 30 by using a known image analysis program to analyze a captured image of ball 30 captured by a high-accuracy camera.

As still another example, motion characteristic acquisition unit 153 may acquire a motion characteristic of a ball based on sensor data detected by a sensor device that is incorporated in the ball when it actually flies and thus comes. Specifically, motion characteristic acquisition unit 153 uses a known ball analysis application program to analyze time-series acceleration information, angular velocity information, and geomagnetic information that are detected by the sensor device to calculate a ball parameter (e.g., a ball speed, how many times the ball rotates, an azimuth angle, an elevation angle, an amount of a horizontal break, and an amount of a vertical break). Motion characteristic acquisition unit 153 compares the calculated ball parameter with ball parameters of types of pitch previously stored in memory 104, and determines a ball parameter of those of the types of pitch that most matches the calculated ball parameter. Motion characteristic acquisition unit 153 determines that the type of pitch corresponding to the determined ball parameter is the type of pitch of ball 30.

When subject 2 swings bat 80 with respect to ball 30, swing information calculation unit 154 calculates swing information corresponding to a motion characteristic of ball 30 based on sensor data detected by at least one of sensor devices 20 and 25.

Specifically, swing information calculation unit 154 calculates at least one of a swing time, a swing speed, an acceleration at impact, a rotational speed, a radius of swing, a vertical bat angle, and a swing orbit as swing information based on sensor data (for example, time-series acceleration information and angular velocity information) detected by sensor device 20. These parameters are calculated by processor 102 executing a known swing analysis program stored in memory 104. Further, swing information calculation unit 154 calculates a maximum angular velocity about the body axis of subject 2 during a swing as swing information based on sensor data (for example, time-series angular velocity information) detected by sensor device 25.

Swing information calculation unit 154 may calculate the swing information when subject 2 wearing HMD 40 swings bat 80 with respect to virtual ball 30 in a virtual reality environment.

Classification unit 156 classifies a plurality of pieces of swing information into a plurality of groups based at least on a motion characteristic of ball 30. Classification unit 156 classifies the swing information corresponding to the type of pitch of "fastball" into group GU1 and classifies the swing information corresponding to the type of pitch of "curveball" into group GU2 based on the motion characteristic (e.g., a ball speed, a type of pitch, and a course) of ball 30. Furthermore, classification unit 156 classifies the swing information corresponding to the course "inside" into group C1, and classifies the swing information corresponding to the course "outside" into group C2.

Furthermore, classification unit 156 may classify a plurality of pieces of swing information into a plurality of groups based on a motion characteristic of ball 30 and a notification condition indicating whether subject 2 is previously notified of the motion characteristic of ball 30. For example, as has been described with reference to FIG. 10, classification unit 156 classifies a plurality of pieces of swing information into groups E1 to E4 based on the notification conditions of "normal" and "random" and the types of pitch of "curveball" and "fastball."

Furthermore, classification unit 156 may classify a plurality of pieces of swing information into a plurality of groups based on a motion characteristic of ball 30 and a hitting result. For example, as has been described with reference to FIG. 7, classification unit 156 classifies a plurality of pieces of swing information into groups B1 to B4 based on the types of pitch of "curveball" and "fastball" and the hitting results of "OK" and "NG."

Furthermore, classification unit 156 may classify a plurality of pieces of swing information into a plurality of groups based on a motion characteristic of ball 30 for the current time (e.g., a k-th time) and a history condition indicating whether a motion characteristic of ball 30 for the immediately previous time (e.g., a (k−1)-th time) is identical to the motion characteristic of ball 30 for the current time. For example, as has been described with reference to FIG. 9, classification unit 156 classifies a plurality of pieces of swing information into groups D1 to D4 based on the types of pitch of "curveball" and "fastball" and a condition of whether the type of pitch for the current time is identical to the type of pitch for the immediately previous time.

For each of the plurality of groups classified by classification unit 156, extraction unit 158 extracts representative swing information in the group based on one or more pieces of swing information belonging to the group. Specifically, extraction unit 158 extracts an average value, a median value, or a variance of the swing information belonging to each group as the representative swing information of the group.

Evaluation unit 160 evaluates subject 2's swing characteristic based on the representative swing information of each group. Specifically, evaluation unit 160 evaluates subject 2's swing characteristic based on a result of comparing the representative swing information of a first group of the plurality of groups and the representative swing information of a second group of the plurality of groups. For example, let us assume that the swing speed included in the representative swing information of group GU2 (that is, an average swing speed for the type of pitch of "curveball") is larger than the swing speed included in the representative swing information of group GU1. (that is, an average swing speed for the type of pitch of "fastball"). In this case, evaluation unit 160 evaluates that subject 2 has such a swing characteristic that the subject swings at a larger speed for "curveball" than "fastball."

Output unit 162 outputs a result of an evaluation of a swing characteristic. Typically, output unit 162 causes display 112 to display a result of an evaluation of a swing characteristic. Output unit 162 may send information indicating the result of the evaluation of the swing characteristic to another external device or may audibly output the result. Output unit 162 may output advice derived from a result an evaluation of a swing characteristic of subject 2. The advice is generated by evaluation unit 160.

Other Embodiments (1) While in the above-described embodiment a ball hitting tool that is a bat is swung, this is not exclusive. Sports such as baseball, tennis, and badminton are common in that subject 2 swings a ball hitting tool with respect to an object (e.g., ball 30) flying and thus coming to the subject. Accordingly, the ball hitting tool may be a racket used in tennis or badminton.

(2) While in the above-described embodiment, basically, swing information is calculated based on sensor data detected by sensor device 20 and that detected by sensor device 25. However, swing information (e.g., a swing time, a swing speed, an acceleration at impact, a rotational speed, a radius of swing, a vertical bat angle, and a swing orbit) may be calculated based only on sensor data detected by sensor device 20, or swing information (a maximum angular velocity about the body axis of subject 2) may be calculated based only on sensor data detected by sensor device 25.

(3) While in the above-described embodiment sensor device 20 is attached to bat 80, sensor device 20 may be attached to the back of a hand of the subject. The "back of a hand" is the back of the hand including a portion from a wrist including a radius and an ulna to the base of the five fingers. For example, sensor device 20 is attached to the back of a hand of subject 2 via a back attachment member such that the angular velocity sensor and the acceleration sensor have one of the three axes (e.g., the x1 axis) directed toward an axis extending from the center of the palm of subject 2 toward the middle finger of subject 2. The z1 axis is set to be an axis extending in the direction of the width of the palm of subject 2, and the y1 axis is set to be an axis extending in a direction orthogonal to the back of the hand of the subject (an axis extending from the palm to the back of the hand). The back attachment member is configured to be capable of securing sensor device 20 to the back of a hand of the batter in a predetermined direction. Sensor device 20 thus detects angular velocity information and acceleration information.

(4) In the above-described embodiment, a program can also be provided for causing a computer to function to execute such control as described in the above-described flowchart. Such a program can also be stored in a non-transitory computer-readable storage medium such as a flexible disk, a CD-ROM (Compact Disk Read Only Memory), a ROM, a RAM, and a memory card accompanying the computer, and thus provided as a program product. Alternatively, the program may be stored in a storage medium such as a hard disk incorporated in a computer, and thus provided. The program can also be downloaded via a network and thus provided.

The program may call a necessary one of program modules provided as a part of an operating system (OS) of a computer, as timed as prescribed, and cause the called module to perform a process. In that case, the program itself does not include the module, and it cooperates with the OS to perform the process. Such a program that does not include a module may also be included in a program according to the present embodiment.

A program according to the present embodiment may be incorporated in a part of another program and thus provided. In that case as well, the program itself does not include a module included in the other program, and it cooperates with the other program to perform a process. Such a program incorporated in the other program may also be included in a program according to the present embodiment.

(5) The configuration indicated as an example of the above-described embodiment is an example of the configuration of the present embodiment, and can be combined with another known technique, or may be modified such that a part thereof is omitted without departing from the gist of the present embodiment. Further, in the above-described embodiment, a process and a configuration described in the other embodiment may be appropriately employed and implemented.

Effect of Embodiment

According to the present embodiment, a swing characteristic of a subject with respect to a ball flying and thus coming to the subject can be evaluated with higher accuracy. This can clarify what motion characteristics of the ball (e.g., a ball speed, a type of pitch, and a course) the subject is good or poor at addressing, and allows the subject to do training based thereon.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An evaluation method for evaluating a swing characteristic of a subject with respect to an approaching object, comprising:
calculating swing information corresponding to a motion characteristic of the approaching object based on sensor data detected by at least one of a first sensor attached to a ball hitting tool or a back of a hand of the subject and a second sensor attached to a waist of the subject when the subject swings the ball hitting tool with respect to the approaching object;
classifying a plurality of pieces of such swing information into a plurality of groups based at least on the motion characteristic of the approaching object;
for each of the plurality of groups, extracting representative swing information in the group based on one or more pieces of swing information belonging to the group;
evaluating a swing characteristic of the subject based on the representative swing information of each group, and
outputting the swing characteristic for display on a display,
wherein the motion characteristic of the approaching object includes a type of pitch of the approaching object.

2. The evaluation method according to claim 1, wherein the calculating includes calculating as the swing information at least one of a time of a swing, a speed of the swing, an acceleration of the swing at impact, a rotational speed at impact, a radius of rotation of the swing, a vertical bat angle of the ball hitting tool, and an orbit of the swing, based on the sensor data detected by the first sensor.

3. The evaluation method according to claim 1, wherein the calculating includes calculating as the swing information a maximum angular velocity about a body axis of the subject, based on the sensor data detected by the second sensor.

4. The evaluation method according to claim 1, wherein the motion characteristic of the approaching object includes at least one of a speed of the object and a course of the approaching object.

5. The evaluation method according to claim 1, wherein the classifying includes classifying the plurality of pieces of such swing information into the plurality of groups based on the motion characteristic of the approaching object and a first condition of whether the subject is previously notified of the motion characteristic of the approaching object.

6. The evaluation method according to claim 1, wherein the classifying includes classifying the plurality of pieces of such swing information into the plurality of groups based on a motion characteristic of the approaching object for a k-th time, k being an integer equal to or greater than 2, and a second condition of whether motion characteristics of the approaching object for a (k−n)-th time to a (k−1)-th time, n being an integer equal to or greater than 1 and less than k, are identical to the motion characteristic of the approaching object for the k-th time, and the motion characteristics of the approaching object for the (k−n)-th time to the (k−1)-th time are identical.

7. The evaluation method according to claim 1, wherein the motion characteristic of the approaching object is determined by an observer who observes the approaching object.

8. The evaluation method according to claim 1, wherein the motion characteristic of the approaching object is determined based on sensor data detected by a third sensor incorporated in the approaching object, a captured image obtained by capturing an image of the approaching object, or data obtained by tracking the approaching object by a radar.

9. The evaluation method according to claim 1, wherein the representative swing information in the group is an average value, a median value, or a variance of one or more pieces of swing information belonging to the group.

10. The evaluation method according to claim 1, wherein the calculating includes calculating the swing information when the subject swings the ball hitting tool with respect to a virtual object in a virtual reality environment.

11. The evaluation method according to claim 1, the evaluating including evaluating the swing characteristic of the subject based on a result of comparing representative swing information of a first group of the plurality of groups and representative swing information of a second group of the plurality of groups, the method further comprising outputting advice derived from a result of evaluating the swing characteristic of the subject.

12. An evaluation system for evaluating a swing characteristic of a subject with respect to an approaching object, comprising:
a swing information calculation unit that calculates swing information corresponding to a motion characteristic of the approaching object based on sensor data detected by at least one of a first sensor attached to a ball hitting tool or a back of a hand of the subject and a second sensor attached to a waist of the subject when the subject swings the ball hitting tool with respect to the approaching object;
a classification unit that classifies a plurality of pieces of such swing information into a plurality of groups based at least on the motion characteristic of the approaching object;
an extraction unit that extracts, for each of the plurality of groups, representative swing information in the group based on one or more pieces of swing information belonging to the group;
an evaluation unit that evaluates a swing characteristic of the subject based on the representative swing information of each group; and
a display for displaying the swing characteristic,
wherein the motion characteristic of the approaching object includes a type of pitch of the approaching object.

13. A non-transitory computer readable medium that stores an evaluation program for causing a computer to evaluate a swing characteristic of a subject with respect to an approaching object, the evaluation program causing the computer to perform:
calculating swing information corresponding to a motion characteristic of the approaching object based on sensor data detected by at least one of a first sensor attached to a ball hitting tool or a back of a hand of the subject and a second sensor attached to a waist of the subject when the subject swings the ball hitting tool with respect to the approaching object;

classifying a plurality of pieces of such swing information into a plurality of groups based at least on the motion characteristic of the approaching object;

for each of the plurality of groups, extracting representative swing information in the group based on one or more pieces of swing information belonging to the group;

evaluating a swing characteristic of the subject based on the representative swing information of each group; and outputting the swing characteristic for display on a display, wherein the motion characteristic of the approaching object includes a type of pitch of the approaching object.

\* \* \* \* \*